Patented Aug. 26, 1952

2,608,577

UNITED STATES PATENT OFFICE 2,608,577

PROCESS FOR PRODUCING DI(ALKYL GLYCOLYL) ESTERS OF ALIPHATIC DICARBOXYLIC ACIDS

William E. Weesner, Webster Groves, Mo., assignor to Monsanto Chemical Company, St. Louis, Mo., a corporation of Delaware No Drawing. Application June 10, 1949, Serial No. 98,397

4 Claims. (Cl. 260—484)

This invention relates to di(alkyl glycolyl) esters of aliphatic dicarboxylic acids having the formula

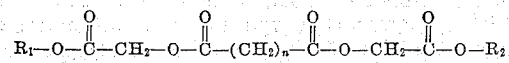

wherein $R_1$ and $R_2$ represent an alkyl radical having from 1 to 18 carbon atoms or an alkoxyethyl radical wherein the alkyl group contains from 1 to 12 carbon atoms, and $n$ is a whole number from 2 to 8 inclusive.

The novel di(alkyl glycolyl) esters of aliphatic dicarboxylic acids of this invention range in appearance from essentially clear, colorless, mobile liquids to relatively low melting solids. They have been found to have exceptional utility as plasticizers and extenders for various natural and synthetic resins, and in particular polyvinyl chloride resins and copolymers containing predominantly combined vinyl chloride as exemplified by copolymers containing 85 to 95% by weight of vinyl chloride and 5 to 15% by weight of vinyl acetate, vinylidene chloride, diethyl maleate, diethyl fumarate or methyl methacrylate.

Various procedures may be utilized in preparing the novel compounds of this invention. Thus, they may be prepared by the direct esterification of an aliphatic dicarboxylic acid having the formula

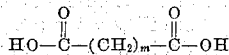

where $m$ is a whole number from 2 to 8 inclusive, with approximately 2 molecular proportions of an alkyl glycolate wherein the alkyl substituent is an alkyl radical containing from 1 to 18 carbon atoms or an alkoxyethyl radical wherein the alkyl group contains from 1 to 12 carbon atoms, in the presence of an acidic catalyst, such as sulfuric acid or toluene sulfonic acid. Preferably, however, these novel compounds are prepared by reacting approximately 2 molecular proportions of an alkyl chloroacetate, wherein the alkyl radical contains from 1 to 18 carbon atoms or 2 molecular proportions of an alkoxyethyl chloroacetate wherein the alkyl substituent contains from 1 to 12 carbon atoms, with a 1 molecular proportion of a di(alkali metal) salt of a dibasic acid having the formula

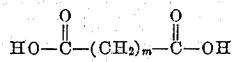

wherein $m$ is a whole number from 2 to 8 inclusive, at a maximum temperature of about 200° C. It is also preferable that this latter reaction be carried out in the presence of catalytic quantities of a tertiary amine catalyst, such as triethylamine or dimethyl cyclohexylamine.

If in the above described process there is utilized in place of the 2 molecular proportions of an alkyl glycolate or 2 molecular proportions of an alkoxyethyl glycolate, 2 molecular proportions of a mixture of dissimilar alkyl glycolates or dissimilar alkoxyethyl glycolates or a mixture of an alkyl glycolate and an alkoxyethyl glycolate, the reaction mass then obtained will contain a mixture of two different symmetrical di(alkyl glycolyl) esters of an aliphatic dicarboxylic acid and an unsymmetrical di(alkyl glycolyl) ester of an aliphatic dicarboxylic acid, which mixture may then be separated into its three components by means of fractional distillation.

Typical of the novel esters of this invention are the di(methyl glycolyl), di(ethyl glycolyl), di(propyl glycolyl), di(isopropyl glycolyl), di(butyl glycolyl), di(isobutyl glycolyl), di(pentyl glycolyl), di(hexyl glycolyl), di(2-methylpentyl glycolyl), di(heptyl glycolyl), di(n-octyl glycolyl), di(capryl glycolyl), di(2-ethylhexyl glycolyl), di(6-methylheptyl glycolyl), di(nonyl glycolyl), di(trimethylhexyl glycolyl), di(decyl glycolyl), di(trimethylheptyl glycolyl), di(undecyl glycolyl), di(dodecyl glycolyl), di(tridecyl glycolyl), di(tetradecyl glycolyl), di(pentadecyl glycolyl), di(hexadecyl glycolyl), di(heptadecyl glycolyl), di(octadecyl glycolyl), di(methoxyethyl glycolyl), di(ethoxyethyl glycolyl), di(propoxyethyl glycolyl), di(isopropoxyethyl glycolyl), di(butoxyethyl glycolyl), di(isobutoxyethyl glycolyl), di(pentoxyethyl glycolyl), di(2-methylpentoxyethyl glycolyl), di(hexoxyethyl glycolyl), di(heptoxyethyl glycolyl), di(octoxyethyl glycolyl), di(2-ethylhexoxyethyl glycolyl), di(6-methylheptoxyethyl glycolyl), di(nonoxyethyl glycolyl), di(decoxyethyl glycolyl), di(undecoxyethyl glycolyl), di(dodecoxyethyl glycolyl), esters of succinic, glutaric, adipic, pimelic, suberic, azelaic and sebacic acids.

The following examples are illustrative of the manner of preparation of the novel esters of this invention and their physical properties:

EXAMPLE I

*Di(butyl glycolyl) adipate*

In a glass reactor, 90.3 g. of butyl chloroacetate and 1.0 ml. of triethylamine were heated with stirring to 100° to 110° C. and then 57.0 g. of dry disodium adipate added. The addition was complete in 15 minutes, after which time the mass was heated at 140° to 165° C. for 18 hours. During the heating period, 30 g. of butyl chloroacetate was added in order to increase the fluidity of the reaction mixture. At the end of the reaction period, the oil was washed with water and sodium carbonate to remove alkali soluble impurities, steamed to remove excess butyl chloroacetate, treated to improve color and dried under vacuum. Di(butyl glycolyl) adipate was thus obtained in an 89% yield based on disodium adipate. The ester had the following properties:

Sp. gr. 25°/25° C _____ 1.0849
$N_D^{25°}$ _____ 1.4461

Saponification number:
  Found: 94.8 g./mol NaOH
  Theory: 93.5 g./mol NaOH

EXAMPLE II

*Di(butyl glycolyl) succinate*

65.1 g. of disodium succinate was added to 171.9 g. of butyl chloroacetate and 2.0 ml. of triethylamine over a period of about 10 minutes at 75° to 85° C. The mass was then heated and held for 11 hours at a temperature of 135° to 145° C. The product was recovered and purified in the manner described in Example I. Di(butyl glycolyl) succinate thus obtained had the following property:

Saponification number:
  Found: 86.5 g./mol NaOH
  Theory: 86.5 g./mol NaOH

EXAMPLE III

*Di(ethyl glycolyl) sebacate*

Following the procedure as described in Example II, di(ethyl glycolyl) sebacate was prepared utilizing 123 g. of disodium sebacate, 147 g. of ethyl chloroacetate and 2 ml. of dimethyl cyclohexylamine. The diethyl sebacate obtained exhibited the following properties:

Sp. gr. 25°/25° C _____ 1.0881
$N_D^{25°}$ _____ 1.4469

Saponification number:
  Found: 93.7 g./mol NaOH
  Theory: 93.5 g./mol NaOH

EXAMPLE IV

*Di(n-octyl glycolyl) adipate*

57 g. of disodium adipate was slowly added to 123.9 g. of n-octyl chloroacetate and 2 ml. of triethylamine contained in a glass reactor at a temperature of about 100° to 110° C. After all of the reactants had been added, the mass was heated to about 160° C. for a period of 18 hours, after which time the di(n-octyl glycolyl) adipate was recovered and purified in the manner described in Example I. It exhibited the following property:

Saponification number:
  Found: 121.5 g./mol NaOH
  Theory: 121.5 g./mol NaOH

EXAMPLE V

*Di(octadecyl glycolyl) succinate*

In a manner similar to that described in Example I, 162 g. of disodium succinate was added to 728.0 g. of octadecyl chloroacetate and 1 ml. of triethylamine. The reaction was then held at 140° to 150° C. for 10 hours, after which time the product was washed with water and a sodium carbonate solution, and steamed and dried. Di(octadecyl glycolyl) succinate was obtained in good yield and purity.

EXAMPLE VI

*Di(butoxyethyl glycolyl) adipate*

In a manner similar to that described in Example I, 95.0 g. of disodium adipate was added to 194.5 g. of butoxyethyl chloroacetate containing 1.0 ml. of triethylamine at 90° to 100° C. Following the addition, the mass was stirred several hours at 150° to 170° C. The crude product was recovered and refined as described in Example I to give di(butoxyethyl glycolyl) adipate in good yield and quality.

EXAMPLE VII

*Di(2-ethylhexoxyethyl glycolyl) sebacate*

Following the procedure as described in Example I, 278.2 g. of dipotassium sebacate was added with stirring to a mixture of 501.0 g. of 2-ethylhexoxyethyl chloroacetate and 2.0 ml. of triethylamine at a temperature of 80° to 90° C. This mass was then stirred an additional six hours at 120° to 130° C. and the crude product recovered and refined. Di(2-ethylhexoxyethyl glycolyl) sebacate was obtained in good yield.

The outstanding utility of the novel compounds of this invention is illustrated by the properties of a plasticized polyvinyl chloride composition containing approximately 40% by weight of di(butyl glycolyl) adipate. A composition was prepared containing 60 parts by weight of a polyvinyl chloride resin formed by the polymerization of vinyl chloride, 38 parts by weight of di(butyl glycolyl) adipate and 2 parts by weight of a basic lead silicate stabilizer. The resin, plasticizer and stabilizer were intimately mixed and fluxed on a differential steel roll mill for 5 minutes at about 160° C. When a homogeneous composition had been formed on the roll, the plasticized polyvinyl chloride composition was sheeted off the roll mill. This composition was then moulded into a 5″ by 5″ by .040″ sheet under a pressure of 2,000 lbs. per square inch at a temperature of 160° C. The composition was clear, substantially colorless, free from odor and exceptionally flexible, as illustrated by its low temperature flexibility of minus 43° F. when determined by the method described by Clash and Berg, Ind. Eng. Chem., 34, 1218 (1942). The degree of flexibility of such compositions may be varied as desired by merely varying the plasticizer content in such a composition. Typical of the wide variety of applications in which such compositions would find outstanding utility are calendered films and sheeting for wearing apparel, shower curtains and seat and cushion coverings, and extruded insulation for electrical wiring.

What is claimed is:

1. A process for the preparation of a di(alkyl glycolyl) ester of an aliphatic dicarboxylic acid having the formula

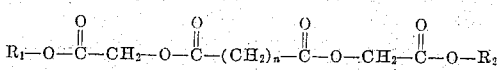

wherein $R_1$ and $R_2$ are selected from the group consisting of alkyl radicals having at least 1 and not more than 18 carbon atoms, and alkoxyethyl radicals wherein the alkyl substituent contains at least 1 and not more than 12 carbon atoms, and $n$ is a whole number from 2 to 8 inclusive, comprising reacting approximately 2 molecular proportions of a compound selected from the group consisting of alkyl chloroacetates wherein the alkyl substituent contains at least 1 and not more than 18 carbon atoms, alkoxyethyl chloroacetates wherein the alkyl substituent contains from 1 to 12 carbon atoms, and mixtures of said alkyl chloroacetates and alkoxyethyl chloroacetates with a 1 molecular proportion of a di(alkali metal) salt of a dicarboxylic acid having the formula

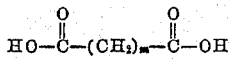

wherein $m$ is a whole number from 2 to 8 inclusive, at a maximum temperature of about 200° C. and recovering therefrom said di(alkyl glycolyl ester of the dicarboxylic acid.

2. The process as described in claim 1 wherein the alkyl chloroacetate is butyl chloroacetate and the di(alkali metal) salt of a dicarboxylic acid is a di(alkali metal) salt of adipic acid.

3. The process as described in claim 1 wherein the alkyl chloroacetate is an octyl chloroacetate and the di(alkali metal) salt of a dicarboxylic acid is a di(alkali metal) salt of adipic acid.

4. The process as described in claim 1 wherein the alkyl chloroacetate is ethyl chloroacetate and the di(alkali metal) salt of a dicarboxylic acid is a di(alkali metal) salt of sebacic acid.

WILLIAM E. WEESNER.

REFERENCES CITED

The following references are of record in the file of this patent:

UNITED STATES PATENTS

| Number | Name | Date |
|---|---|---|
| 2,260,295 | Carruthers | Oct. 28, 1941 |
| 2,379,251 | Muskat | June 26, 1945 |